A. Taggart.
Excavator.
Nº 17,595.   Patented Jan. 16, 1857.
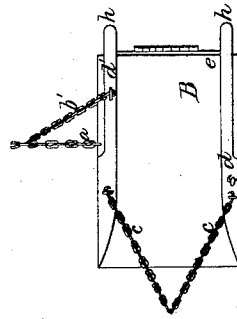
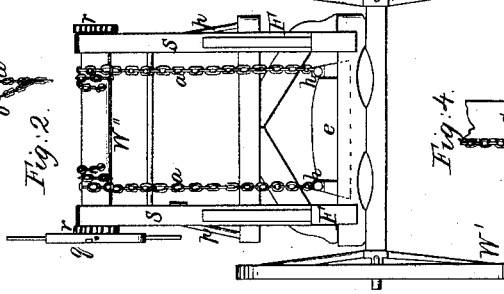
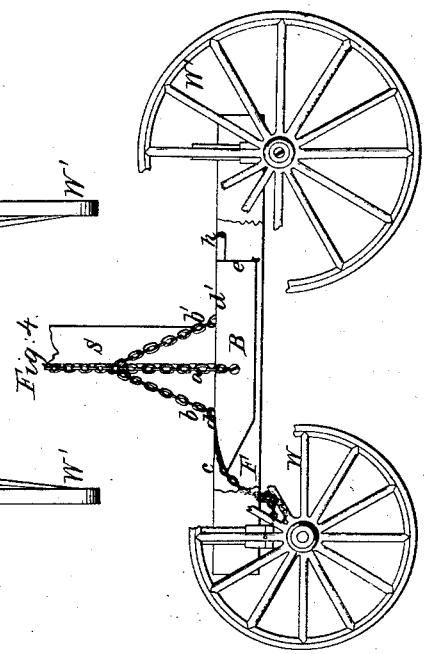
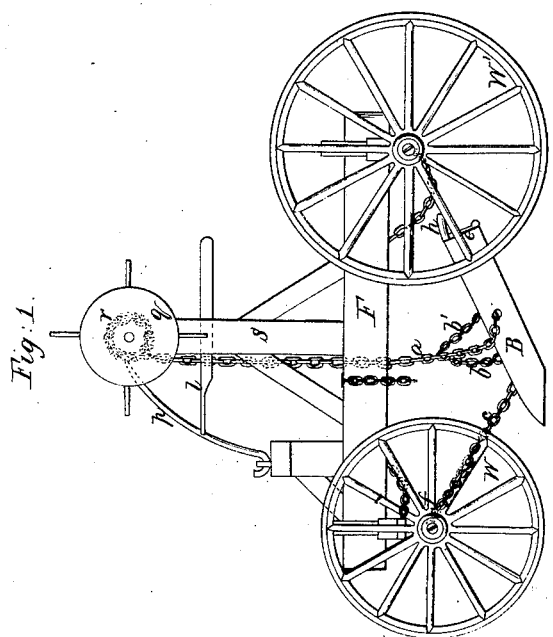
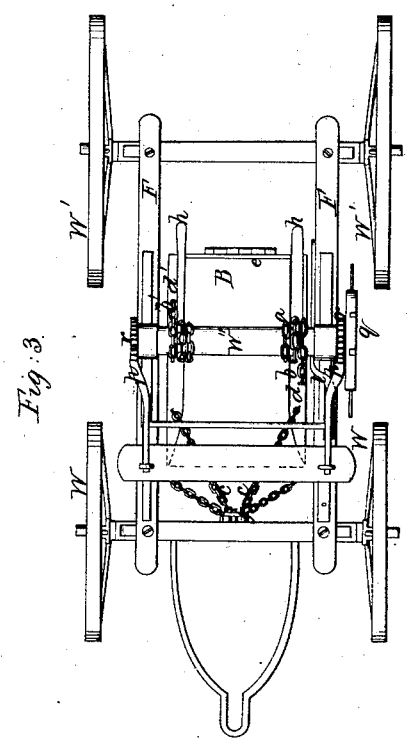

UNITED STATES PATENT OFFICE.

ALONZO TAGGART, OF WARRENTON, MISSOURI.

EXCAVATING-MACHINE.

Specification of Letters Patent No. 17,595, dated June 16, 1857.

*To all whom it may concern:*

Be it known that I, ALONZO TAGGART, of Warrenton, in the county of Warren and State of Missouri, have invented a new and useful Improvement in Machines for Excavating and Conveying Earth; and I do hereby declare that the following is a full, clear, and exact description of the construction and operation of the same, reference being had to the annexed drawing, forming part of this specification, in which—

Figure 1 is a side elevation of my machine in position for loading, the scoop being held in the inclined position shown by the operator. Fig. 2 is a rear elevation with scoop in position for conveying. Fig. 3 is a top view of the machine with scoop in conveying position. Fig. 4 is a side view showing scoop in conveying position.

Similar characters of reference denote the same part.

The object of my invention is to provide a free draft connection of the scraper; facility in the carriage of the product of excavation, and ease in the discharge of the same, combined with a vertical adjustment of the operating position of the said scraper.

The nature of the invention consists in suspending the scraper by chains passing over an elevated windlass, so that it will balance while stay chains run from the suspension chains to points on opposite sides thereof, to steady the load during its transit and facilitate the discharge thereof, at either front or rear of the scraper, the draft connection consisting of two chains running to the center of the front axle, supporting the frame within which the scraper is suspended, the details of construction and operation being as follows:

In the drawing F is the main frame, supported by the four wheels W W′. Upon the frame are standards S, holding a windlass W″ operated by levers, and held in any desired position by the ratchets $r$ $r$ and pawls $p$ $p$, which are disconnected at pleasure by means of the lever $l$ or any suitable device.

B is the scraper attached to chains $a$ $a$ so as to balance when empty. These chains pass over the windlass W″ and serve to give the scraper any desired vertical position. Stay chains $b$ $b'$ with hooks at their extremities run, the one to a point $d'$ of the scraper, behind the point of suspension, and the other to a point $d$ on the other side of the scraper in front of the point of suspension. The chains $c$ $c$ run from the front of the scraper to the middle of the front axle $f$, and constitute the draft attachment. The scraper has handles $h$ $h$ to be held by the operator while the excavation is progressing. The rear portion of the scraper consists of a hinged door $e$, which is allowed to drop when the contents are to be discharged from the rear.

The operation of the excavator is as follows:—The scraper is lowered to the ground and held by the operator in the position shown in Fig. 1, as the machine moves forward, the suspension and stay chains hanging loose, the loose draft attachment $c$ $c$, placing the scraper entirely under the control of the operator and permitting it to yield to obstructions. When the scraper is filled, it is raised to the position shown in Fig. 4 by levers inserted in wheel $q$, and then carried to the place of deposit. Then either the front or rear stay chain is unhooked and a slight exertion of the operator tilts the scraper, and the load is discharged.

This connection of scraper with the frame by chains $a$ $a$ and $c$ $c$ admits of the operation of excavating on ridges elevated above the surface on which the wheels move or in trenches below the said surface, an ordinary machine of this kind being susceptible of a range of about six feet in vertical adjustment. The load being suspended by chains $a$ $a$, and held by the stay chains $b$ $b'$, the removal of either of the stays will admit of the turning of the scraper upon the attachment of chains $a$ $a$ thereto with but a very small application of power at the opposite extremity of the scraper.

What I claim as new and desire to secure by Letters Patent, is—

The free draft connection of the scraper by chains $c$ $c$ in combination with the balancing suspension chains $a$ $a$ and the opposite stay chains $b$ $b'$, arranged and operating in connection with frame and windlass substantially as and for the purposes set forth.

In testimony whereof, I have hereunto signed my name before two subscribing witnesses.

ALONZO TAGGART.

Witnesses:
GEO. PATTEN,
JOHN S. HOLLINGSHEAD.